(12) United States Patent
Bajpai

(10) Patent No.: US 11,657,619 B2
(45) Date of Patent: *May 23, 2023

(54) VEHICULAR TRAILERING ASSIST SYSTEM

(71) Applicant: MAGNA ELECTRONICS INC., Auburn Hills, MI (US)

(72) Inventor: Devendra Bajpai, Bloomfield Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,065

(22) Filed: Dec. 20, 2021

(65) Prior Publication Data

US 2022/0114814 A1    Apr. 14, 2022

Related U.S. Application Data

(63) Continuation of application No. 16/947,894, filed on Aug. 24, 2020, now Pat. No. 11,205,080, which is a continuation of application No. 14/316,939, filed on Jun. 27, 2014, now Pat. No. 10,755,110.

(60) Provisional application No. 61/840,542, filed on Jun. 28, 2013.

(51) Int. Cl.
*B60R 1/00* (2022.01)
*G06V 20/56* (2022.01)

(52) U.S. Cl.
CPC ............... *G06V 20/56* (2022.01); *B60R 1/00* (2013.01); *B60R 2300/304* (2013.01); *B60R 2300/806* (2013.01)

(58) Field of Classification Search
CPC .... G06V 20/56; B60R 1/00; B60R 2300/304; B60R 2300/806
See application file for complete search history.

(56) References Cited

U.S. PATENT DOCUMENTS

| | | |
|---|---|---|
| 5,355,118 A | 10/1994 | Fukuhara |
| 5,426,294 A | 6/1995 | Kobayashi et al. |
| 5,444,478 A | 8/1995 | Lelong et al. |
| 5,530,420 A | 6/1996 | Tsuchiya et al. |
| 5,550,677 A | 8/1996 | Schofield et al. |
| 5,555,312 A | 9/1996 | Shima et al. |
| 5,670,935 A | 9/1997 | Schofield et al. |
| 5,675,489 A | 10/1997 | Pomerleau |
| 5,724,316 A | 3/1998 | Brunts |
| 5,757,949 A | 5/1998 | Kinoshita et al. |

(Continued)

*Primary Examiner* — Hesham K Abouzahra
(74) *Attorney, Agent, or Firm* — Honigman LLP

(57) ABSTRACT

A vehicular trailering assist system includes a rear backup camera disposed at a rear portion of a vehicle and a video display screen disposed in the vehicle and viewable by a driver of the vehicle. During a reversing maneuver of the vehicle with the trailer hitched thereto, the vehicular trailering assist system determines a projected path of travel of the vehicle with the trailer hitched thereto based at least in part on (i) image data captured by the rear backup camera, (ii) vehicle parameters provided to the vehicular trailering assist system and (iii) trailer parameters provided to the vehicular trailering assist system. During the reversing maneuver of the vehicle with the trailer hitched thereto, the video display screen displays the projected path for viewing by the driver of the equipped vehicle during the reversing maneuver.

20 Claims, 4 Drawing Sheets

(56) References Cited

U.S. PATENT DOCUMENTS

| | | |
|---|---|---|
| 5,760,828 A | 6/1998 | Cortes |
| 5,760,962 A | 6/1998 | Schofield et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,796,094 A | 8/1998 | Schofield et al. |
| 5,837,994 A | 11/1998 | Stam et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,897 A | 3/1999 | Schofield et al. |
| 5,883,739 A | 3/1999 | Ashihara et al. |
| 5,884,212 A | 3/1999 | Lion |
| 5,890,021 A | 3/1999 | Onoda |
| 5,959,555 A | 9/1999 | Furuta |
| 5,963,247 A | 10/1999 | Banitt |
| 5,964,822 A | 10/1999 | Alland et al. |
| 6,175,300 B1 | 1/2001 | Kendrick |
| 6,266,442 B1 | 7/2001 | Laumeyer et al. |
| 6,285,393 B1 | 9/2001 | Shimoura et al. |
| 6,317,057 B1 | 11/2001 | Lee |
| 6,333,759 B1 | 12/2001 | Mazzilli |
| 6,370,329 B1 | 4/2002 | Teuchert |
| 6,430,303 B1 | 8/2002 | Naoi et al. |
| 6,477,464 B2 | 11/2002 | McCarthy et al. |
| 6,480,104 B1 | 11/2002 | Wall et al. |
| 6,483,429 B1 | 11/2002 | Yasui et al. |
| 6,553,130 B1 | 4/2003 | Lemelson et al. |
| 6,559,761 B1 | 5/2003 | Miller et al. |
| 6,578,017 B1 | 6/2003 | Ebersole et al. |
| 6,594,583 B2 | 7/2003 | Ogura et al. |
| 6,636,258 B2 | 10/2003 | Strumolo |
| 6,678,614 B2 | 1/2004 | McCarthy et al. |
| 6,690,268 B2 | 2/2004 | Schofield et al. |
| 6,703,925 B2 | 3/2004 | Steffel |
| 6,704,621 B1 | 3/2004 | Stein et al. |
| 6,721,659 B2 | 4/2004 | Stopczynski |
| 6,744,353 B2 | 6/2004 | Sjonell |
| 6,823,241 B2 | 11/2004 | Shirato et al. |
| 6,824,281 B2 | 11/2004 | Schofield et al. |
| 6,889,161 B2 | 5/2005 | Winner et al. |
| 7,004,593 B2 | 2/2006 | Weller et al. |
| 7,004,606 B2 | 2/2006 | Schofield |
| 7,005,974 B2 | 2/2006 | McMahon et al. |
| 7,006,127 B2 | 2/2006 | Mizusawa et al. |
| 7,038,577 B2 | 5/2006 | Pawlicki et al. |
| 7,085,637 B2 | 8/2006 | Breed et al. |
| 7,092,548 B2 | 8/2006 | Laumeyer et al. |
| 7,133,661 B2 | 11/2006 | Hatae et al. |
| 7,158,015 B2 | 1/2007 | Rao et al. |
| 7,167,796 B2 | 1/2007 | Taylor et al. |
| 7,195,381 B2 | 3/2007 | Lynam et al. |
| 7,202,776 B2 | 4/2007 | Breed |
| 7,227,611 B2 | 6/2007 | Hull et al. |
| 7,375,803 B1 | 5/2008 | Bamji |
| 7,483,058 B1 | 1/2009 | Frank et al. |
| 7,633,383 B2 | 12/2009 | Dunsmoir et al. |
| 7,676,087 B2 | 3/2010 | Dhua et al. |
| 7,690,737 B2 | 4/2010 | Lu |
| 7,720,580 B2 | 5/2010 | Higgins-Luthman |
| 7,843,451 B2 | 11/2010 | Lafon |
| 8,010,252 B2 | 8/2011 | Getman et al. |
| 8,038,166 B1 | 10/2011 | Piesinger |
| 8,063,752 B2 | 11/2011 | Oleg |
| 8,138,899 B2 | 3/2012 | Ghneim |
| 8,164,628 B2 | 4/2012 | Stein et al. |
| 8,218,007 B2 | 7/2012 | Lee et al. |
| 8,224,031 B2 | 7/2012 | Saito |
| 8,260,518 B2 | 9/2012 | Englert |
| 8,451,107 B2 | 5/2013 | Lu et al. |
| 9,085,261 B2 | 7/2015 | Lu et al. |
| 10,755,110 B2 | 8/2020 | Bajpai |
| 11,205,080 B2 | 12/2021 | Bajpai |
| 2007/0154068 A1 | 7/2007 | Stein et al. |
| 2008/0053740 A1 | 3/2008 | Hublart et al. |
| 2008/0162000 A1* | 7/2008 | Dattilo .............. B62D 6/008 701/42 |
| 2008/0180526 A1 | 7/2008 | Trevino |
| 2008/0231701 A1* | 9/2008 | Greenwood ......... G01B 11/272 348/148 |
| 2009/0079828 A1 | 3/2009 | Lee et al. |
| 2009/0143967 A1 | 6/2009 | Lee et al. |
| 2009/0236825 A1 | 9/2009 | Okuda et al. |
| 2010/0014770 A1 | 1/2010 | Huggett et al. |
| 2010/0085170 A1 | 4/2010 | Oleg |
| 2010/0110189 A1 | 5/2010 | Kuboyama et al. |
| 2010/0324770 A1 | 12/2010 | Ramsey et al. |
| 2011/0050903 A1 | 3/2011 | Vorobiev |
| 2012/0045112 A1 | 2/2012 | Lundblad et al. |
| 2012/0265416 A1 | 10/2012 | Lu et al. |
| 2014/0085472 A1 | 3/2014 | Lu et al. |
| 2014/0136052 A1* | 5/2014 | Kossira .............. B62D 13/06 701/41 |
| 2014/0160276 A1 | 6/2014 | Pliefke et al. |
| 2014/0200759 A1 | 7/2014 | Lu et al. |
| 2014/0218506 A1 | 8/2014 | Trombley et al. |
| 2014/0303847 A1* | 10/2014 | Lavoie .............. B62D 15/0275 701/41 |
| 2015/0002670 A1 | 1/2015 | Bajpai |
| 2015/0217693 A1 | 8/2015 | Pliefke et al. |

\* cited by examiner

V = Vehicle Velocity
φ = Steering Angle/Wheel Angle
$\theta_1$ = Vehicle Heading.
$\theta_2$ = Trailer Heading.
ε = Trailer Angle w.r.t. Vehicle.
L = Length Front Axle to Rear Axle
L1 = Length Rear Axle to Hitch Point.
L2 = Length Hitch Point to Trailer Rear Axle.

VEHICULAR TRAILERING ASSIST SYSTEM

CROSS REFERENCE TO RELATED APPLICATIONS

The present application is a continuation of U.S. patent application Ser. No. 16/947,894, filed Aug. 24, 2020, now U.S. Pat. No. 11,205,080, which is a continuation of U.S. patent application Ser. No. 14/316,939, filed Jun. 27, 2014, now U.S. Pat. No. 10,755,110, which claims the filing benefits of U.S. provisional application Ser. No. 61/840,542, filed Jun. 28, 2013, which is hereby incorporated herein by reference in its entirety.

FIELD OF THE INVENTION

The present invention relates generally to rear vision systems for vehicles and, more particularly, to rear vision systems having a rearward facing camera at a rear portion of a vehicle.

BACKGROUND OF THE INVENTION

Rear backup cameras and vision systems are known for use in vehicles. Examples of such systems are described in U.S. Pat. Nos. 7,859,565; 6,611,202; 6,222,447; 5,949,331; 5,670,935 and/or 5,550,677, which are hereby incorporated herein by reference in their entireties. Such systems may display images for viewing by the driver of the vehicle that provide a view rearward of the vehicle.

SUMMARY OF THE INVENTION

The present invention provides a trailer angle prediction system or trailering assist system for a vehicle that includes at least one camera disposed at a vehicle and having an exterior field of view rearward of the vehicle. The camera is operable to capture image data. A control includes an image processor operable to process captured image data. The control of the trailering assist system is operable, such as in response to image processing and/or one or more trailer/vehicle parameters, to determine a trailer angle of a trailer that is towed by the vehicle, and the control of the trailering assist system may be operable to determine a path of the trailer responsive to a steering angle of the vehicle. The control of the trailering assist system may predict the steering wheel angle of the vehicle (based on the determined trailer angle and other trailer/vehicle parameters) and compare that with the measured or determined or actual steering wheel angle to determine an error or offset. The trailering assist system may correct for the offset to enhance the trailer angle determination and/or to enhance reversing of the vehicle and trailer along a selected or appropriate rearward path. The trailering assist system may be operable to display information for viewing by the driver to assist the driver in driving the vehicle with the trailer, and may display the predicted path that the trailer and vehicle are traveling along and/or the appropriate path to reverse the trailer to a selected location or parking area.

These and other objects, advantages, purposes and features of the present invention will become apparent upon review of the following specification in conjunction with the drawings.

DESCRIPTION OF THE PREFERRED EMBODIMENTS

Figure 1:
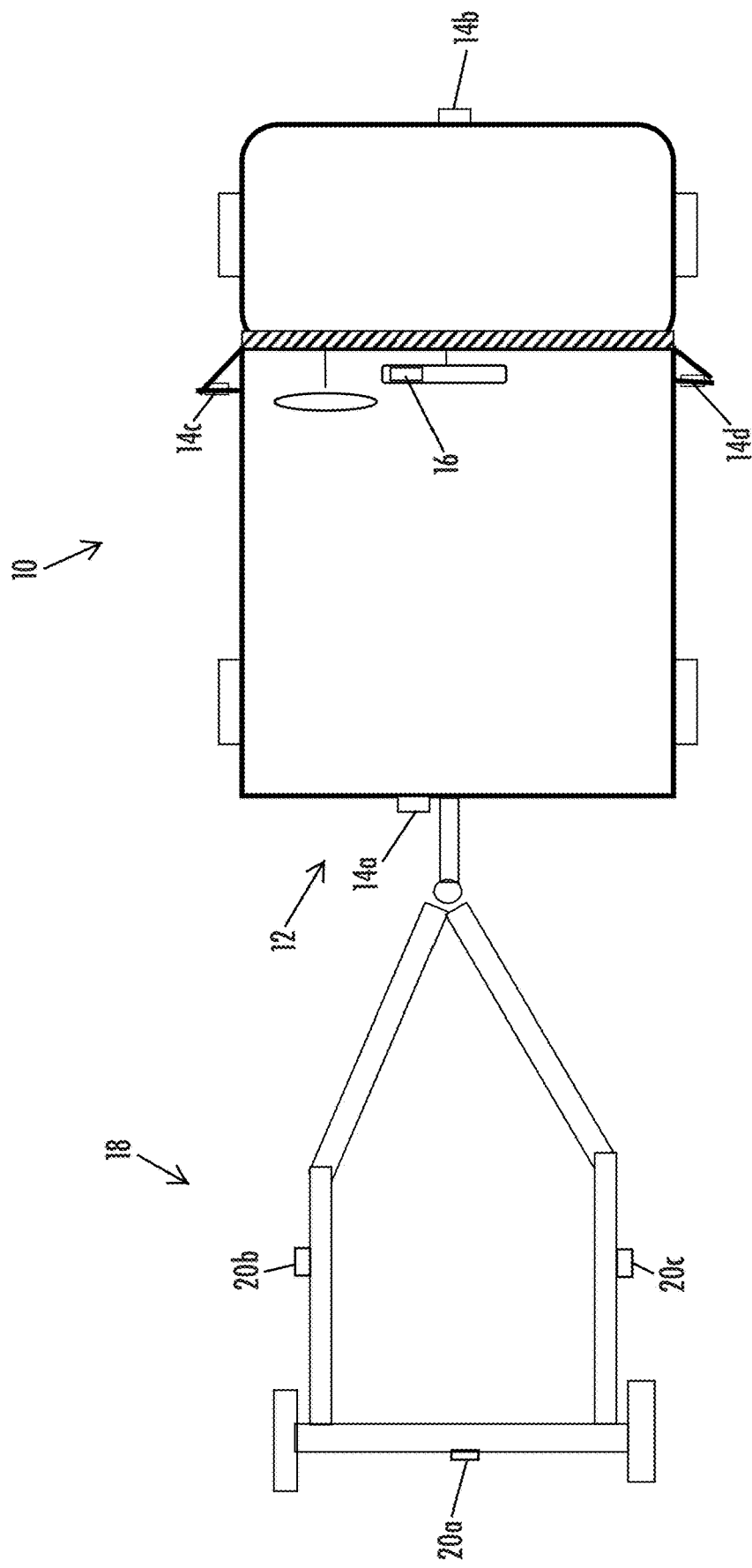
FIG. 1 is a plan view of a vehicle equipped with the rear vision system and trailer detection system of the present invention, shown towing a trailer.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14d at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. In the illustrated embodiment, the vehicle is towing a trailer 18 and the vision system 12 may include one or more cameras (or receives and processes image data captured by one or more cameras at the trailer), such as a rearward facing camera 20a at the rear of the trailer and sidewardly facing cameras 20b, 20c at the sides of the trailer. The system, responsive to processing of image data captured by the cameras 14a-d (and optionally cameras 20a-c), may be operable to display a bird's eye view or top down view of the vehicle and trailer to assists the driver in maneuvering the vehicle with the trailer, such as during a reversing maneuver of the vehicle and trailer. Optionally, the vision system or trailering assist system may process image data to detect objects, such as objects to the rear of the subject or equipped vehicle during a reversing maneuver, or such as approaching or following vehicles or vehicles at a side lane adjacent to the subject or equipped vehicle or the like.

The trailer angle viewing system or trailering assist system of the present invention may utilize aspects of the trailer angle detection systems described in International Publication No. WO 2012/103193, and/or U.S. patent application Ser. No. 14/102,981, filed Dec. 11, 2013, now U.S. Pat. No. 9,558,409, and/or Ser. No. 14/036,723, filed Sep. 25, 2013, now U.S. Pat. No. 9,446,713, which are hereby incorporated herein by reference in their entireties.

As discussed in U.S. patent application Ser. No. 14/102,981, filed Dec. 11, 2013, now U.S. Pat. No. 9,558,409, and/or Ser. No. 14/036,723, filed Sep. 25, 2013, now U.S. Pat. No. 9,446,713, which are hereby incorporated herein by reference in their entireties, the display system may provide a projection of the trailer's position during a reversing maneuver. The normal view of a backup camera on a trailer pulling vehicle is typically blocked by the trailer, and thus such a backup camera cannot provide visual backup assistance to the driver when the trailer is attached to the vehicle. However, the camera system of the present invention may be operable to detect the angle of the trailer longitudinal axis with respect to the pulling vehicle's longitudinal axis, and with the knowledge of the trailer dimensional characteristics (such as wheel position and distance from the vehicle and the like), the processor can calculate and project a trajectory or reversing path of the trailer in the form of graphic overlay on the camera display or video display (typically disposed in the vehicle, such as at or in or near an interior rearview mirror assembly of the vehicle) to indicate to the driver viewing the video display a path or trajectory of where the trailer is backing up to during the vehicle and trailer reversing maneuver. In addition, when the trailer pulling or towing vehicle is equipped with side view cameras, the added views provided by the side cameras (typically having fields of view directed generally rearwardly and sidewardly with respect to the direction of forward travel of the equipped vehicle) can provide additional scene information of the trailer to assist the driver of the vehicle (viewing the images at a video display of the vehicle) during a reversing or backing up maneuver. The calculated graphical trailer path can be overlaid to the side camera image to further assist the driver of the vehicle during a reversing or backing up maneuver.

Most drivers find it challenging to back up a trailer on their vehicle due to the dynamic interaction between the relative positions of the vehicle, trailer and front vehicle wheel angles. Most drivers use a trial and error method where they attempt to learn the results of the various stages of the maneuver by making short trial runs. The present invention provides a determination of the trailer angle (the angle of the longitudinal axis of the towed trailer relative to the longitudinal axis of the towing vehicle) and a prediction or estimation of the trailer angle, such as based on the vehicle dynamics and the vehicle and trailer parameters. The trailer angle detection and prediction system or trailering assist system is useful in assisting a driver in parking a trailer at a parking space.

Figure 2:
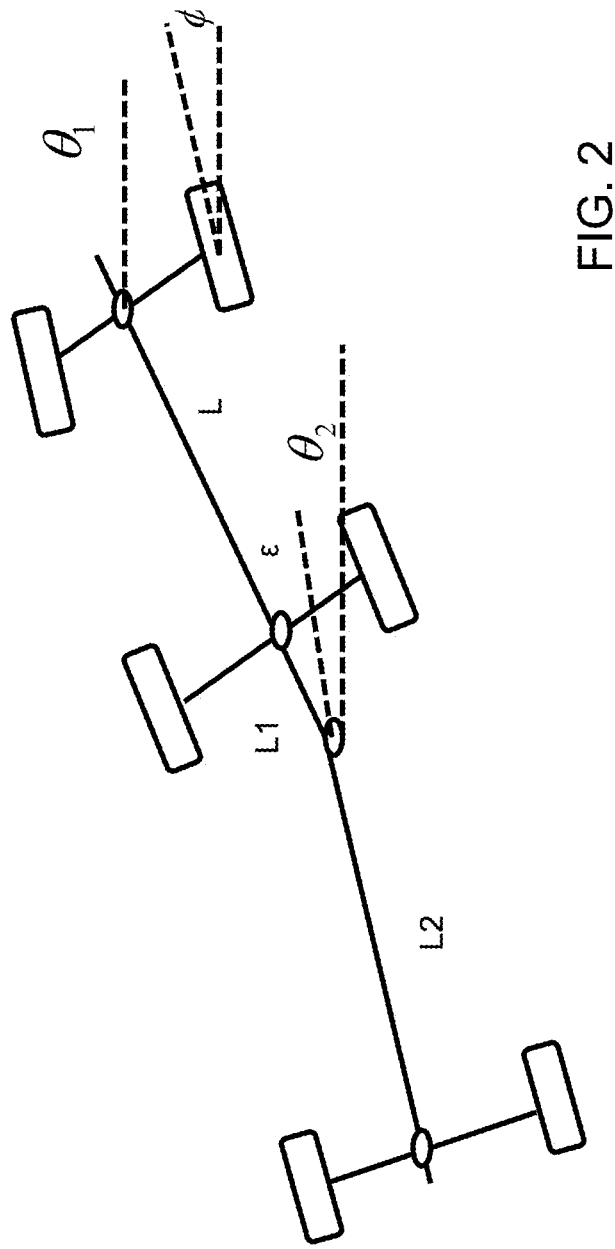
FIG. 2 is schematic of the vehicle and trailer of FIG. 1.
Figure 3:
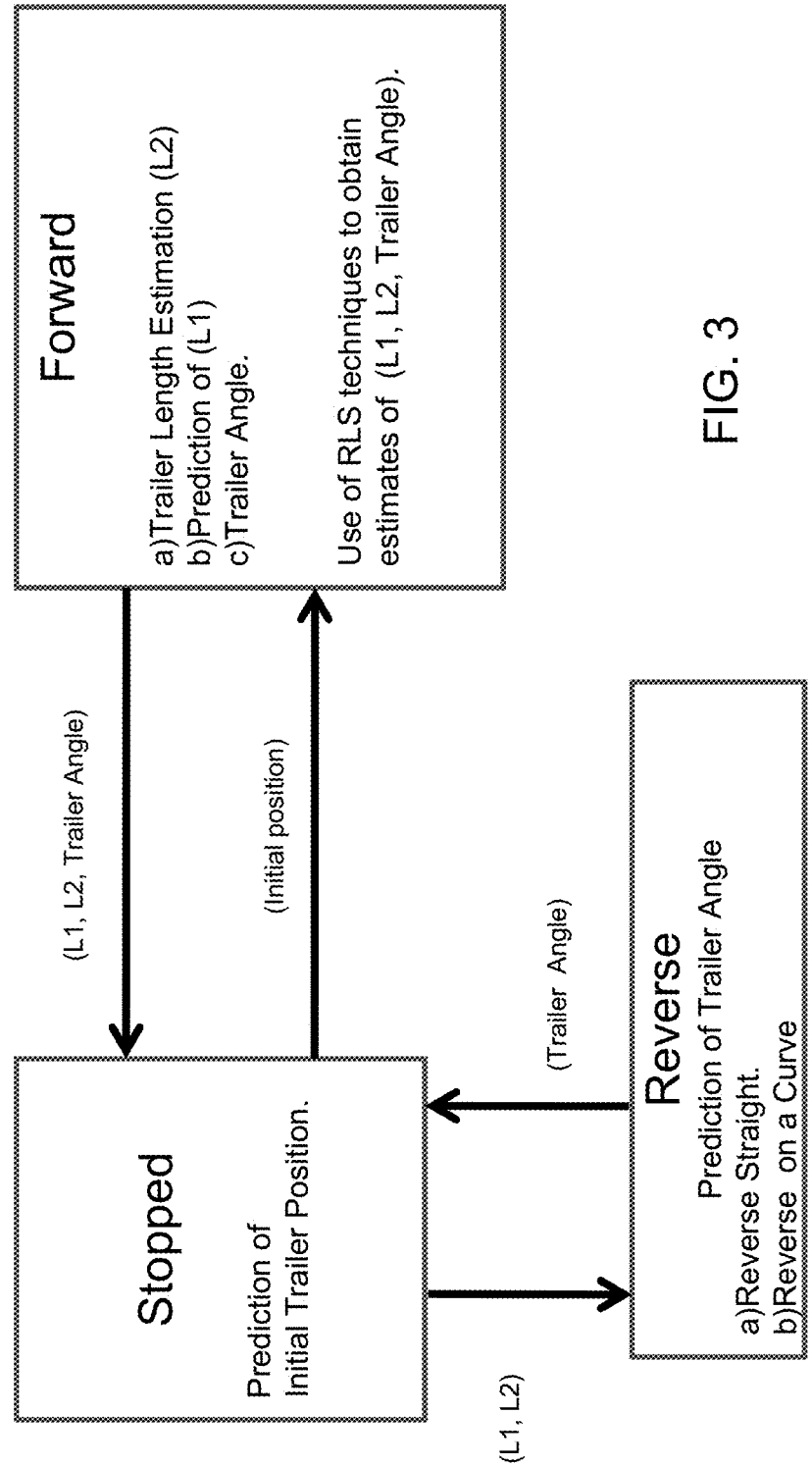
FIG. 3 is a block diagram of the prediction states of the trailer angle detection system of the present invention.

As shown in FIG. 2, various parameters of the vehicle and the trailer that is being towed by the vehicle can be measured or determined and/or input into the system of the present invention. The system of the present invention is operable to determine the trailer angle or predict the trailer angle when the vehicle is stopped and/or moving in a forward direction and/or moving in a rearward direction. The system may determine or estimate some of the parameters (such as the length or distance (L1) between the vehicle rear axle and he hitch point, the length or distance (L2) between the hitch point and the trailer axle and trailer angle relative to the vehicle), with less dependence on user inputs. For example, the system may estimate or predict some of the parameters while the vehicle is traveling forward, and may predict the initial trailer angle before reversing. The trailer angle prediction may be continuously updated while the trailer is reversing, whereby the trailer angle estimation may be used for self-parking of the vehicle-trailer combination.

Figure 4:
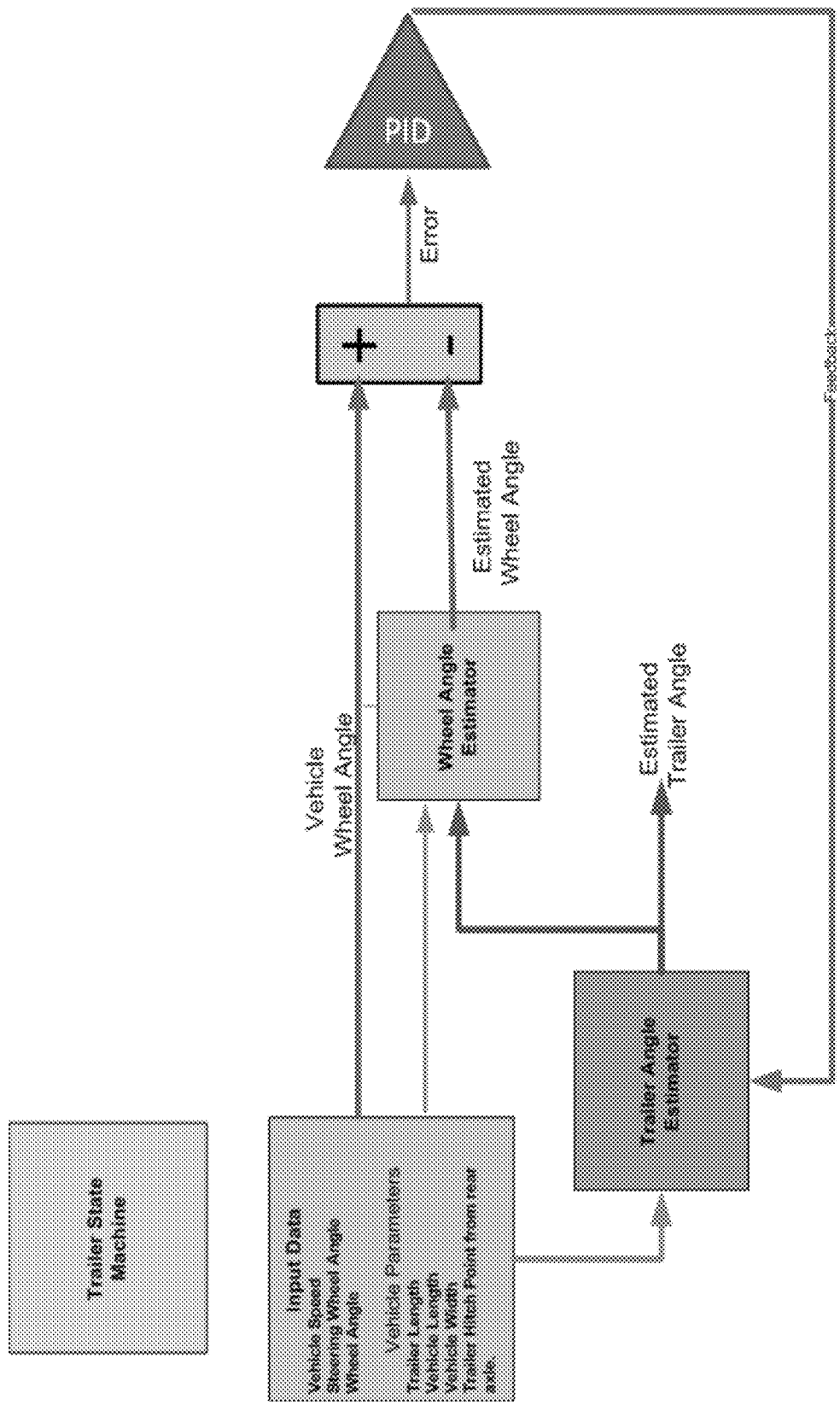
FIG. 4 is a block diagram of the trailer angle detection system of the present invention.

As shown in FIG. 4, the system may use some of the vehicle and/or trailer parameters (such as trailer length, vehicle length, vehicle width and distance between the rear axle of the vehicle and the trailer hitch point or point where trailer pivots relative to the towing vehicle) as inputs and, based on the inputs, the system may estimate the trailer angle (such as via a trailer angle estimator) and the vehicle wheel angle (such as via a wheel angle estimator), which is then compared to the input value or vehicle wheel angle to determine an error between the actual wheel angle (such as determined by a steering wheel angle or wheel angle sensor) and the estimated wheel angle. The estimation process of the trailer angle detection or prediction system or trailering assist system of the present invention thus uses the vehicle inputs and parameters to estimate the trailer angle relative to the towing vehicle, and estimates the trailer angle for the given driving condition and steering direction or steering angle.

For example, during a reversing maneuver of the vehicle, the system may determine an estimated trailer angle and, using the estimated trailer angle, may estimate the steering angle or wheel angle of the towing vehicle (based on the vehicle and trailer parameters and direction of travel and/or other inputs). The estimated wheel angle of the towing vehicle is compared to the determined or measured wheel angle (such as determined by or received from a vehicle status system or sensor and vehicle network bus or the like). The error or difference between the estimated wheel angle and the determined or actual wheel angle is used to modify the estimated trailer angle in subsequent determinations. When the error is within a threshold level, the system may continue to monitor the angles as the driver of the vehicle continues the driving maneuver. When the determined error is at or above a threshold level or amount, the system may alert the driver of the vehicle (such as via a visual or audible alert or the like) that the trailer angle may not be at an expected angle for that steering angle, so that the driver can check to make sure that the driving maneuver is guiding (pushing or pulling) the trailer in the right direction towards the targeted location. Optionally, during a reversing maneuver where the system displays a graphic overlay to represent the trailer in the displayed images, the system may utilize the wheel angle error determination to adjust the graphic overlay angle relative to the rear of the vehicle. The system may determine the error between estimated and actual wheel angles during both forward and rearward driving maneuvers.

The estimated trailer angle, along with the vehicle parameters, is used to estimate the wheel angle of the vehicle for that estimated trailer angle (and that particular direction of travel of the vehicle and trailer). The difference between the actual or determined wheel angle (such as measured or determined by a sensor or the like of the vehicle) and the estimated wheel angle is the error or offset that needs to be minimized by the driver and the system. The output of the PID controller is used as a feedback to update the parameters used to compute the trailer angle estimate.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent application Ser. No. 14/359,341, filed May 20, 2014, now U.S. Pat. No. 10,071,687; Ser. No. 14/359,340, filed May 20, 2014, now U.S. Pat. No. 10,099,614; Ser. No. 14/282,029, filed May 20, 2014, now U.S. Pat. No. 9,205,776; Ser. No. 14/282,028, filed May 20, 2014, now U.S. Pat. No. 9,563,951; Ser. No. 14/358,232, filed May 15, 2014, now U.S. Pat. No. 9,491,451; Ser. No. 14/272,834, filed May 8, 2014, now U.S. Pat. No. 9,280,202; Ser. No. 14/356,330, filed May 5, 2014, now U.S. Pat. No. 9,604,581; Ser. No. 14/269,788, filed May 5, 2014, now U.S. Pat. No. 9,508,014; Ser. No. 14/268,169, filed May 2, 2014, and published on Nov. 6, 2014 as U.S. Publication No. US-2014-0327772; Ser. No. 14/264,443, filed Apr. 29, 2014, now U.S. Pat. No. 10,232,797; Ser. No. 14/354,675, filed Apr. 28, 2014, now U.S. Pat. No. 9,580,013; Ser. No. 14/248,602, filed Apr. 9, 2014, now U.S. Pat. No. 9,327,693; Ser. No. 14/242,038, filed Apr. 1, 2014, now U.S. Pat. No. 9,487,159; Ser. No. 14/229,061, filed Mar. 28, 2014, now U.S. Pat. No. 10,027,930; Ser. No. 14/343,937, filed Mar. 10, 2014, now U.S. Pat. No. 9,681,062; Ser. No. 14/343,936, filed Mar. 10, 2014, and published on Aug. 7, 2014 as U.S. Publication No. US-2014-0218535; Ser. No. 14/195,135, filed Mar. 3, 2014, now U.S. Pat. No. 9,688,200; Ser. No. 14/195,136, filed Mar. 3, 2014, now U.S. Pat. No. 10,057,544; Ser. No. 14/191,512, filed Feb. 27, 2014, now U.S. Pat. No. 10,179,543; Ser. No. 14/183,613, filed Feb. 19, 2014, now U.S. Pat. No. 9,445,057; Ser. No. 14/169,329, filed Jan. 31, 2014, and published Aug. 7, 2014 as U.S. Publication No. US-2014-0218529; Ser. No. 14/169,328, filed Jan. 31, 2014, now U.S. Pat. No. 9,092,986; Ser. No. 14/163,325, filed Jan. 24, 2014, and published Jul. 31, 2014 as U.S. Publication No. US-2014-02110009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published Jun. 19, 2014 as U.S. Publication No. US-2014-0168437; Ser. No. 14/098,817, filed Dec. 6, 2013, and published Jun. 19, 2014 as U.S. Publication No. 2014/0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, now U.S. Pat. No. 10,025,994; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,963; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published Jan. 23, 2014 as U.S. Publication No. US-2014-0025240; Ser. No. 13/942,753, filed Jul. 16, 2013, and published on Jan. 30, 2014 as U.S. Publication No. US-2014-0028852; Ser. No. 13/927,680, filed Jun. 26, 2013, and published on Jan. 2, 2014 as U.S. Publication No. US-2014-0005907; Ser. No. 13/916,051, filed Jun. 12, 2013, now U.S. Pat. No. 9,077,098; Ser. No. 13/894,870, filed May 15, 2013, now U.S. Pat. No. 10,089,537; Ser. No. 13/887,724, filed May 6, 2013, now U.S. Pat. No. 9,670,895; Ser. No. 13/852,190, filed Mar. 28, 2013, now U.S. Pat. No. 10,457,209; Ser. No. 13/851,378, filed Mar. 27, 2013, now U.S. Pat. No. 9,319,637; Ser. No. 13/848,796, filed Mar. 22, 2012, now U.S. Pat. No. 10,609,335; Ser. No. 13/847,815, filed Mar. 20, 2013, and published Oct. 21, 2013 as U.S. Publication No. US-2013-0286193; Ser. No. 13/800,697, filed Mar. 13, 2013, now U.S. Pat. No. 10,182,228; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published on Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574 and/or Ser. No. 13/534,657, filed Jun. 27, 2012, and published Jan. 3, 2013 as U.S. Publication No. US-2013-0002873, and/or U.S. provisional applications, Ser. No. 62/001,796, filed May 22, 2014; Ser. No. 62/001,796, filed May 22, 2014; Ser. No. 61/993,736, filed May 15, 2014; Ser. No. 61/991,810, filed May 12, 2014; Ser. No. 61/991,809, filed May 12, 2014; Ser. No. 61/990,927, filed May 9, 2014; Ser. No. 61/989,652, filed May 7, 2014; Ser. No. 61/981,938, filed Apr. 21, 2014; Ser. No. 61/981,937, filed Apr. 21, 2014; Ser. No. 61/977,941, filed Apr. 10, 2014; Ser. No. 61/977,940, filed Apr. 10, 2014; Ser. No. 61/977,929, filed Apr. 10, 2014; Ser. No. 61/977,928, filed Apr. 10,2014; Ser. No. 61/973,922, filed Apr. 2, 2014; Ser. No. 61/972,708, filed Mar. 31, 2014; Ser. No. 61/972, 707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941, 568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864, 836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013; Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830, 375, filed Jun. 3, 2013 and/or Ser. No. 61/830,377, filed Jun. 3, 2013; which are all hereby incorporated herein by reference in their entireties. The system may communicate with other communication systems via any suitable means, such as by utilizing aspects of the systems described in International Publication Nos. WO 2010/144900; WO 2013/ 043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/ or WO 2013/016409, and/or U.S. Pat. Publication No. US 2010-0020170, and/or U.S. patent application Ser. No. 13/534,657, filed Jun. 27, 2012, and published Jan. 3, 2013 as U.S. Publication No. US-2013-0002873, which are all hereby incorporated herein by reference in their entireties.

The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, now U.S. Pat. No. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670, 935; 5,760,962; 5,715,093; 5,877,897; 6,922,292; 6,757, 109; 6,717,610; 6,590,719; 6,201,642; 6,498,620; 5,796, 094; 6,097,023; 6,320,176; 6,559,435; 6,831,261; 6,806, 452; 6,396,397; 6,822,563; 6,946,978; 7,339,149; 7,038, 577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526, 103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498, 620; 6,523,964; 6,611,202; 6,201,642; 6,690,268; 6,717, 610; 6,757,109; 6,802,617; 6,806,452; 6,822,563; 6,891, 563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006- 0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular trailering assist system comprising:
a rear backup camera disposed at a rear portion of a vehicle equipped with the vehicular trailering assist system, the rear backup camera viewing at least rearward of the equipped vehicle;
wherein the rear backup camera comprises a CMOS imaging array having at least one million photosensors arranged in rows and columns;
an image processor operable to process image data captured by the rear backup camera;
a video display screen disposed in the equipped vehicle and viewable by a driver of the equipped vehicle, the video display screen operable to display video images derived from image data captured by the rear backup camera;
wherein, with a trailer hitched to a hitch point of the equipped vehicle, the rear backup camera views at least part of the trailer that is hitched to the hitch point of the equipped vehicle;
wherein, during a reversing maneuver of the equipped vehicle with the trailer hitched thereto, the vehicular trailering assist system determines a projected path of travel of the equipped vehicle with the trailer hitched thereto based at least in part on (i) image data captured by the rear backup camera and processed at the image processor, (ii) vehicle parameters provided to the vehicular trailering assist system and (iii) trailer parameters provided to the vehicular trailering assist system;

wherein the vehicle parameters include (i) steering angle of the equipped vehicle and (ii) length between the hitch point and a rear axle of the equipped vehicle;

wherein the trailer parameters include (i) trailer angle, wherein the trailer angle comprises an angle between a longitudinal axis of the trailer and a longitudinal axis of the equipped vehicle, and (ii) length between the hitch point and an axle of the trailer; and wherein, during the reversing maneuver of the equipped vehicle with the trailer hitched thereto, the video display screen displays the projected path for viewing by the driver of the equipped vehicle during the reversing maneuver.

2. The vehicular trailering assist system of claim 1, wherein the projected path is displayed at the video display screen as a graphic overlay overlaid at displayed video images derived from image data captured by the rear backup camera.

3. The vehicular trailering assist system of claim 1, wherein the projected path is displayed at the video display screen as a graphic overlay that overlays video images displayed on the video display screen to assist the driver during the reversing maneuver of the equipped vehicle with the trailer hitched thereto.

4. The vehicular trailering assist system of claim 1, wherein the vehicular trailering assist system generates an alert to the driver of the equipped vehicle to assist the driver in adjusting the steering angle of the equipped vehicle to guide the trailer towards a target location.

5. The vehicular trailering assist system of claim 4, wherein the alert comprises at least one selected from the group consisting of an audible alert and a visual alert.

6. The vehicular trailering assist system of claim 1, wherein the vehicular trailering assist system determines a target path for the equipped vehicle with the trailer hitched thereto to follow to reverse the trailer towards a target location.

7. The vehicular trailering assist system of claim 6, wherein the video display screen displays the target path to assist the driver of the equipped vehicle in maneuvering the equipped vehicle with the trailer hitched thereto to reverse the trailer towards the target location.

8. The vehicular trailering assist system of claim 1, wherein the vehicle parameters provided to the vehicular trailering assist system further include at least one selected from the group consisting of (i) speed of the equipped vehicle, (ii) length of the equipped vehicle and (iii) width of the equipped vehicle.

9. The vehicular trailering assist system of claim 1, wherein the trailer parameters provided to the vehicular trailering assist system further include length of the trailer.

10. The vehicular trailering assist system of claim 1, wherein the vehicular trailering assist system generates an alert to alert the driver of a potentially hazardous situation during the reversing maneuver of the equipped vehicle with the trailer hitched thereto.

11. A vehicular trailering assist system comprising:

a rear backup camera disposed at a rear portion of a vehicle equipped with the vehicular trailering assist system, the rear backup camera viewing at least rearward of the equipped vehicle;

wherein the rear backup camera comprises a CMOS imaging array having at least one million photosensors arranged in rows and columns;

an image processor operable to process image data captured by the rear backup camera;

a video display screen disposed in the equipped vehicle and viewable by a driver of the equipped vehicle, the video display screen operable to display video images derived from image data captured by the rear backup camera;

wherein, with a trailer hitched to a hitch point of the equipped vehicle, the rear backup camera views at least part of the trailer that is hitched to the hitch point of the equipped vehicle;

wherein, during a reversing maneuver of the equipped vehicle with the trailer hitched thereto, the vehicular trailering assist system determines a projected path of travel of the equipped vehicle with the trailer hitched thereto based at least in part on (i) image data captured by the rear backup camera and processed at the image processor, (ii) vehicle parameters provided to the vehicular trailering assist system and (iii) trailer parameters provided to the vehicular trailering assist system;

wherein the vehicle parameters include (i) steering angle of the equipped vehicle and (ii) length between the hitch point and a rear axle of the equipped vehicle;

wherein the trailer parameters include (i) trailer angle, wherein the trailer angle comprises an angle between a longitudinal axis of the trailer and a longitudinal axis of the equipped vehicle, and (ii) length between the hitch point and an axle of the trailer;

wherein, during the reversing maneuver of the equipped vehicle with the trailer hitched thereto, the video display screen displays the projected path for viewing by the driver of the equipped vehicle during the reversing maneuver;

wherein the vehicular trailering assist system determines a target path for the equipped vehicle with the trailer hitched thereto to follow to reverse the trailer towards a target location;

wherein, during the reversing maneuver of the equipped vehicle with the trailer hitched thereto, the video display screen displays the target path for viewing by the driver of the equipped vehicle during the reversing maneuver; and wherein the projected path and the target path are displayed at the video display screen as graphic overlays that overlay video images displayed on the video display screen to assist the driver in reversing the equipped vehicle with the trailer hitched thereto toward the target location.

12. The vehicular trailering assist system of claim 11, wherein the vehicular trailering assist system generates an alert to the driver of the equipped vehicle to assist the driver in adjusting the steering angle of the equipped vehicle to guide the trailer towards a target location.

13. The vehicular trailering assist system of claim 12, wherein the alert comprises at least one selected from the group consisting of an audible alert and a visual alert.

14. The vehicular trailering assist system of claim 11, wherein the video display screen displays the target path to assist the driver of the equipped vehicle in maneuvering the equipped vehicle with the trailer hitched thereto to reverse the trailer towards the target location.

15. The vehicular trailering assist system of claim 11, wherein the vehicle parameters provided to the vehicular trailering assist system further include at least one selected from the group consisting of (i) speed of the equipped vehicle, (ii) length of the equipped vehicle and (iii) width of the equipped vehicle.

16. The vehicular trailering assist system of claim 11, wherein the trailer parameters provided to the vehicular trailering assist system further include length of the trailer.

17. The vehicular trailering assist system of claim 11, wherein the vehicular trailering assist system generates an alert to alert the driver of a potentially hazardous situation during the reversing maneuver of the equipped vehicle with the trailer hitched thereto.

18. A vehicular trailering assist system comprising:
- a rear backup camera disposed at a rear portion of a vehicle equipped with the vehicular trailering assist system, the rear backup camera viewing at least rearward of the equipped vehicle;
- wherein the rear backup camera comprises a CMOS imaging array having at least one million photosensors arranged in rows and columns;
- an image processor operable to process image data captured by the rear backup camera;
- a video display screen disposed in the equipped vehicle and viewable by a driver of the equipped vehicle, the video display screen operable to display video images derived from image data captured by the rear backup camera;
- wherein, with a trailer hitched to a hitch point of the equipped vehicle, the rear backup camera views at least part of the trailer that is hitched to the hitch point of the equipped vehicle;
- wherein, during a reversing maneuver of the equipped vehicle with the trailer hitched thereto, the vehicular trailering assist system determines a projected path of travel of the equipped vehicle with the trailer hitched thereto based at least in part on (i) image data captured by the rear backup camera and processed at the image processor, (ii) vehicle parameters provided to the vehicular trailering assist system and (iii) trailer parameters provided to the vehicular trailering assist system;
- wherein the vehicle parameters include (i) steering angle of the equipped vehicle and (ii) length between the hitch point and a rear axle of the equipped vehicle;
- wherein the trailer parameters include (i) trailer angle, wherein the trailer angle comprises an angle between a longitudinal axis of the trailer and a longitudinal axis of the equipped vehicle, and (ii) length between the hitch point and an axle of the trailer;
- wherein, during the reversing maneuver of the equipped vehicle with the trailer hitched thereto, the video display screen displays the projected path for viewing by the driver of the equipped vehicle during the reversing maneuver;
- wherein the projected path is displayed at the video display screen as a graphic overlay that overlays video images displayed on the video display screen to assist the driver during the reversing maneuver of the equipped vehicle with the trailer hitched thereto; and
- wherein the vehicular trailering assist system generates an alert to alert the driver of a potentially hazardous situation during the reversing maneuver of the equipped vehicle with the trailer hitched thereto.

19. The vehicular trailering assist system of claim 18, wherein the vehicle parameters provided to the vehicular trailering assist system further include at least one selected from the group consisting of (i) speed of the equipped vehicle, (ii) length of the equipped vehicle and (iii) width of the equipped vehicle.

20. The vehicular trailering assist system of claim 18, wherein the trailer parameters provided to the vehicular trailering assist system further include length of the trailer.

* * * * *